United States Patent
Kurita et al.

(10) Patent No.: US 10,703,402 B2
(45) Date of Patent: Jul. 7, 2020

(54) STEERING SUPPORT STRUCTURE

(71) Applicant: TOYOTA JIDOSHA KABUSHIKI KAISHA, Toyota-shi (JP)

(72) Inventors: Kazuaki Kurita, Toyota (JP); Akihiro Deshimaru, Miyoshi (JP); Hiroshi Ioku, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 47 days.

(21) Appl. No.: 15/722,515

(22) Filed: Oct. 2, 2017

(65) Prior Publication Data
US 2018/0099689 A1 Apr. 12, 2018

(30) Foreign Application Priority Data
Oct. 12, 2016 (JP) ................. 2016-201004

(51) Int. Cl.
*B62D 1/16* (2006.01)
*B62D 25/14* (2006.01)
*B62D 1/19* (2006.01)

(52) U.S. Cl.
CPC ............. *B62D 1/195* (2013.01); *B62D 1/16* (2013.01); *B62D 25/145* (2013.01)

(58) Field of Classification Search
CPC ......... B62D 1/16; B62D 1/195; B62D 25/145
See application file for complete search history.

(56) References Cited

U.S. PATENT DOCUMENTS

| | | | | | |
|---|---|---|---|---|---|
| 3,972,457 | A | * | 8/1976 | Kesler | B60R 9/12 224/511 |
| 4,126,827 | A | * | 11/1978 | Negrini | H04R 1/08 200/61.54 |
| 4,160,302 | A | * | 7/1979 | Hirst | E01H 1/0845 15/340.3 |
| 4,240,307 | A | * | 12/1980 | Yamazaki | B60T 7/101 74/503 |
| 4,299,081 | A | * | 11/1981 | Harris | A01D 46/28 56/330 |
| 4,384,861 | A | * | 5/1983 | Lange | B62D 1/185 464/168 |
| 4,459,796 | A | * | 7/1984 | Stokes | A01D 34/8355 56/14.3 |
| 4,877,264 | A | * | 10/1989 | Cuevas | B60R 21/2032 280/731 |

(Continued)

FOREIGN PATENT DOCUMENTS

DE 10 2009 026 299 A1 2/2011
JP 2002-193109 A 7/2002
(Continued)

*Primary Examiner* — Frank B Vanaman
(74) *Attorney, Agent, or Firm* — Oblon, McClelland, Maier & Neustadt, L.L.P.

(57) ABSTRACT

A steering support structure includes: an instrument panel reinforcement extending in a vehicle width direction; and a steering support bracket attached to the instrument panel reinforcement and supports a steering column. The steering support bracket includes an upper bracket joined to an upper side of the instrument panel reinforcement in a vehicle up-down direction, and a lower bracket joined to a lower side of the instrument panel reinforcement in the vehicle up-down direction and fastened and fixed to the upper bracket.

6 Claims, 5 Drawing Sheets

(56) References Cited

U.S. PATENT DOCUMENTS

| | | | | |
|---|---|---|---|---|
| 4,895,390 A * | 1/1990 | Fujikawa | ............... | B62D 1/195 |
| | | | | 280/777 |
| 5,114,182 A * | 5/1992 | Thull | ................ | B62D 1/195 |
| | | | | 280/779 |
| 6,391,470 B1 * | 5/2002 | Schmieder | .......... | B62D 25/145 |
| | | | | 280/779 |
| 2002/0117350 A1 * | 8/2002 | Koelle | ................. | G10K 11/16 |
| | | | | 181/205 |
| 2002/0117842 A1 * | 8/2002 | Takano | .................... | B62D 1/16 |
| | | | | 280/779 |
| 2005/0093285 A1 * | 5/2005 | Lee | ................ | B60R 21/09 |
| | | | | 280/779 |
| 2005/0275207 A1 | 12/2005 | Park | | |
| 2007/0175375 A1 * | 8/2007 | Watanabe | ............ | B62D 25/145 |
| | | | | 114/144 R |
| 2008/0054680 A1 | 3/2008 | Ellison et al. | | |
| 2010/0101090 A1 | 4/2010 | Nakano et al. | | |
| 2010/0140912 A1 | 6/2010 | Zornack et al. | | |
| 2011/0227369 A1 * | 9/2011 | Abe | ........................ | B62D 21/15 |
| | | | | 296/193.02 |
| 2012/0049573 A1 * | 3/2012 | Atsumi | ................. | B62D 25/145 |
| | | | | 296/193.02 |
| 2014/0001792 A1 * | 1/2014 | Aoki | ........................ | B62D 21/15 |
| | | | | 296/193.09 |
| 2014/0252793 A1 * | 9/2014 | Arzoumanian | ...... | B62D 25/145 |
| | | | | 296/72 |

FOREIGN PATENT DOCUMENTS

| | | |
|---|---|---|
| JP | 2008-56230 | 3/2008 |
| JP | 5864492 | 2/2016 |
| KR | 2002-0078283 A | 10/2002 |
| KR | 2002-0080715 A | 10/2002 |
| WO | WO 2008/009683 A1 | 1/2008 |

* cited by examiner

STEERING SUPPORT STRUCTURE

INCORPORATION BY REFERENCE

The disclosure of Japanese Patent Application No. 2016-201004 filed on Oct. 12, 2016 including the specification, drawings and abstract is incorporated herein by reference in its entirety.

BACKGROUND

1. Technical Field

The present disclosure relates to a steering support structure.

2. Description of Related Art

Japanese Patent Application Publication No. 2008-056230 (JP 2008-056230 A) describes a structure in which a steering column support bracket (a steering support bracket) made of light alloy is attached to a hanger beam (an instrument panel reinforcement) made of light alloy. Note that there is a structure described in Japanese Patent No. 5864492 as a structure including a composite part in which a steering column support bracket and an instrument panel reinforcement are formed integrally with each other by die-casting.

SUMMARY

The structure described in JP 2008-056230 A requires a gap between the instrument panel reinforcement and the bracket so as to pass the instrument panel reinforcement through the bracket, and therefore, it is difficult for the bracket to make close contact with the instrument panel reinforcement. As a result, there is such a possibility that a load from a steering may not be transmitted to the instrument panel reinforcement efficiently, and there is a room for improvement.

The present disclosure provides a technique to obtain a steering support structure that can efficiently transmit a load from a steering to an instrument panel reinforcement.

A first aspect of the present disclosure provides a steering support structure including: an instrument panel reinforcement extending in a vehicle width direction; and a steering support bracket attached to the instrument panel reinforcement and supports a steering column. The steering support bracket includes an upper bracket joined to an upper side of the instrument panel reinforcement in a vehicle up-down direction, and a lower bracket joined to a lower side of the instrument panel reinforcement in the vehicle up-down direction and fastened and fixed to the upper bracket.

In the first aspect, the steering support bracket that supports the steering column is attached to the instrument panel reinforcement and the steering support bracket is constituted by the upper bracket and the lower bracket. The upper bracket is welded to a top side of the instrument panel reinforcement. The lower bracket is joined to a bottom side of the instrument panel reinforcement, and further, the lower bracket and the upper bracket are fastened and fixed to each other. Hereby, the upper bracket can make close contact with the top side of the instrument panel reinforcement and the lower bracket can make close contact with the instrument panel reinforcement so as to sandwich the instrument panel reinforcement between the upper bracket and the lower bracket, and the upper bracket and the lower bracket can be joined to each other. Hereby, a load from a steering can be efficiently transmitted to the instrument panel reinforcement via the upper bracket and the lower bracket.

Further, the upper bracket and the lower bracket are fastened and fixed to each other. Hereby, even in a case where the lower bracket or the upper bracket is constituted by a die-casting product that can be hardly welded, for example, the upper bracket and the lower bracket can be fixed firmly to each other.

A second aspect of the present disclosure provides a steering support structure including: an instrument panel reinforcement extending in a vehicle width direction, the instrument panel reinforcement including attachment portions formed integrally with the instrument panel reinforcement and provided on an upper side of the instrument panel reinforcement in a vehicle up-down direction; a steering support bracket attached to the instrument panel reinforcement and supports a steering column, the steering support bracket including a lower bracket joined to a lower side of the instrument panel reinforcement in the vehicle up-down direction and joined to the attachment portions.

In the second aspect, the steering support bracket that supports the steering column is attached to the instrument panel reinforcement and the steering support bracket includes the lower bracket joined to the bottom side of the instrument panel reinforcement. The instrument panel reinforcement includes the upper attachment portions formed integrally with the instrument panel reinforcement and extending from the instrument panel reinforcement, and the lower bracket is joined to the attachment portions. Hereby, the lower bracket can be joined to the attachment portions in a state where the lower bracket makes close contact with the bottom side of the instrument panel reinforcement, so that a load from a steering can be efficiently transmitted to the instrument panel reinforcement via the lower bracket.

In the first aspect, a ductility of the upper bracket may be higher than a ductility of the lower bracket.

With the above configuration, since the ductility of the upper bracket is higher than the ductility of the lower bracket, it is possible to restrain crack of the lower bracket by transmitting an input load at the time of a front collision to the upper bracket so that the input load is absorbed by the upper bracket.

In the first aspect, the steering column may be supported by the lower bracket.

With the above configuration, since the steering column is supported by the lower bracket and the ductility of the upper bracket is higher than the ductility of the lower bracket, it is possible to increase support stiffness of the steering column by the lower bracket. Hereby, a load from the steering can be efficiently transmitted from the lower bracket to the instrument panel reinforcement.

In the first aspect, the upper bracket may be joined to the instrument panel reinforcement by welding; and the lower bracket may be a die-casting product and may be joined to the instrument panel reinforcement by fastening.

In the above configuration, the lower bracket is a die-casting product that can be hardly welded, and the lower bracket is joined to the instrument panel reinforcement by fastening. Further, the upper bracket is joined to the instrument panel reinforcement by welding. Hereby, the lower bracket and the upper bracket can be firmly joined to the instrument panel reinforcement.

In the first aspect, the instrument panel reinforcement may have a cylindrical shape. And the upper bracket may include: a first curved portion curved along an upper side of an outer peripheral surface of the instrument panel reinforcement in the vehicle up-down direction; a front attachment portion extending from a vehicle front-side end of the first curved portion to a vehicle forward direction; and a rear attachment portion extending from a vehicle rear-side end of the first curved portion to a vehicle rearward direction. And the lower bracket may include: a second curved portion curved along a lower side of the outer peripheral surface of the instrument panel reinforcement in the vehicle up-down direction; a front extension portion extending from a vehicle front-side end of the second curved portion to the vehicle forward direction and fastened and fixed to the front attachment portion; and a rear extension portion extending from a vehicle rear-side end of the second curved portion to the vehicle rearward direction and fastened and fixed to the rear attachment portion.

In the second aspect, the attachment portions may be fastened and fixed to the lower bracket.

In the above configuration, the attachment portions extending from the instrument panel reinforcement are fastened and fixed to the lower bracket. Hereby, even in a case where the lower bracket is constituted by a die-casting product that can be hardly welded, the attachment portions can be firmly fixed to the lower bracket.

With the steering support structure of the present disclosure, it is possible to efficiently transmit a load from the steering to the instrument panel reinforcement.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes embodiments of the present disclosure in detail with reference to the drawings. Note that an arrow FR, an arrow UP, and an arrow LH described appropriately in each drawing indicate a front direction, an upper direction, and a left direction at the time of facing the front direction, in a vehicle to which a steering support structure of the embodiments of the present disclosure is applied. Hereinafter, in a case where a description is made by use of directions of front and rear, up and down, and right and left without any special mention, they indicate front and rear of a front-rear direction in the vehicle, up and down of an up-down direction, and right and left of a right-left direction (a vehicle width direction) at the time of facing the front direction.

First Embodiment

With the use of FIGS. 1 to 4, the following describes a steering support structure of the first embodiment.

Figure 1:
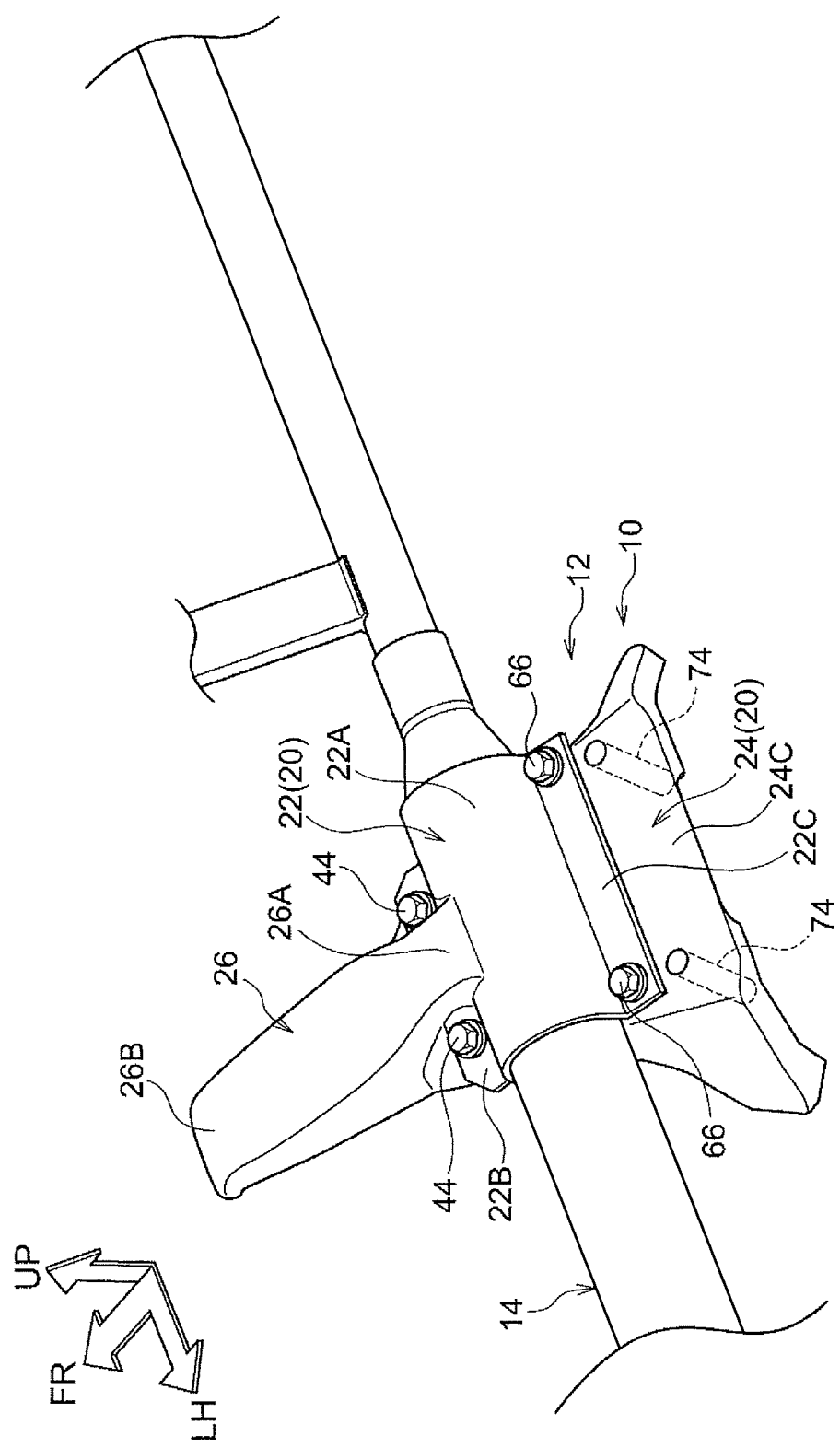
FIG. 1 is a perspective view illustrating a state where a steering support structure of a first embodiment is seen from a vehicle diagonally rearward direction.
Figure 2:
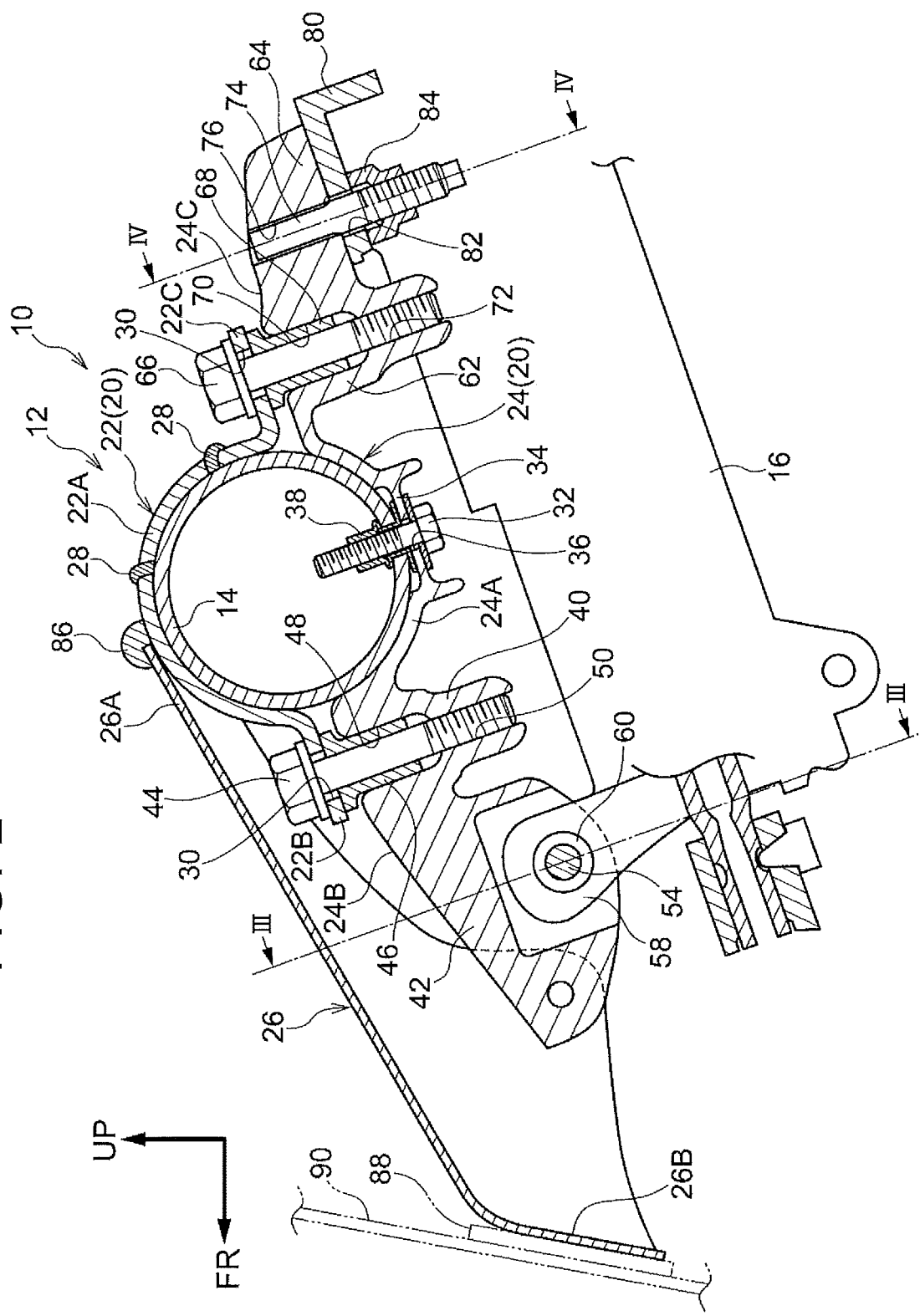
FIG. 2 is a sectional view illustrating the steering support structure illustrated in FIG. 1.

FIG. 1 is a perspective view illustrating a vehicle 10 to which a steering support structure 12 of the first embodiment is applied. Further, FIG. 2 is a sectional view illustrating the steering support structure 12 illustrated in FIG. 1. As illustrated in FIGS. 1 and 2, the vehicle 10 is provided with an instrument panel reinforcement 14 extending in the vehicle width direction. A steering support bracket 20 that supports a steering column 16 is attached to the instrument panel reinforcement 14. The steering support bracket 20 is constituted by an upper bracket 22 joined to a top side of the instrument panel reinforcement 14, and a lower bracket 24 joined to a bottom side of the instrument panel reinforcement 14.

That is, the steering support structure 12 includes the instrument panel reinforcement 14 and the steering support bracket 20, and the steering support bracket 20 is constituted by the upper bracket 22 and the lower bracket 24. In the present embodiment, the steering support bracket 20 is constituted by two components, i.e., the upper bracket 22 and the lower bracket 24.

A dash-to-brace 26 extending toward a vehicle front side from a position where the upper bracket 22 is attached to the instrument panel reinforcement 14 is provided on a top side of the upper bracket 22.

The instrument panel reinforcement 14 is configured such that cylindrical pipes having different outside diameters are connected to each other in an axial direction (see FIG. 1). In the present embodiment, a left side, in a width direction, of the instrument panel reinforcement 14 is a driver side, and an outside diameter of a part of the instrument panel reinforcement 14 on the left side in the width direction is larger than an outside diameter of a part of the instrument panel reinforcement 14 on a right side in the width direction (see FIG. 1). Although not illustrated herein, both ends of the instrument panel reinforcement 14 are joined to right and left front pillars and several intermediate parts thereof are fixed to a vehicle body by braces and the like. The instrument panel reinforcement 14 is made of light alloy such as aluminum alloy, for example.

The upper bracket 22 and the lower bracket 24 are attached to the driver side of the instrument panel reinforcement 14 in the width direction. The steering column 16 is supported by the lower bracket 24 (see FIG. 2). Note that the steering column 16 is not illustrated in FIG. 1.

As illustrated in FIG. 2, the steering column 16 is placed in a diagonal direction so that a front end in a vehicle front-rear direction is placed on a lower side and a rear end in the vehicle front-rear direction is placed on an upper side. Although not illustrated herein, the steering column 16 is configured such that a steering main shaft is supported rotatably by a column tube via a bearing, and a steering wheel is fixed to the rear end of the steering main shaft with a locknut. A structure in which the steering column 16 is supported by the lower bracket 24 will be described later.

As illustrated in FIG. 2, the upper bracket 22 is placed so as to cover an upper side of the instrument panel reinforcement 14 (see FIG. 1). The upper bracket 22 includes: a curved portion 22A curved along a top face of an outer peripheral surface of the instrument panel reinforcement 14; a front attachment portion 22B extending forward from a front end of the curved portion 22A; and a rear attachment portion 22C extending rearward from a rear end of the curved portion 22A. The curved portion 22A is formed generally in a semicircular shape in a section along the vehicle front-rear direction, and has a shape fitted to the top face of the outer peripheral surface of the instrument panel reinforcement 14. The curved portion 22A is placed so as to make contact with, that is, make close contact with the top face of the outer peripheral surface of the instrument panel reinforcement 14 from the upper side. The curved portion 22A of the upper bracket 22 is joined to a top side of the instrument panel reinforcement 14 by a plurality of welded portions 28. For example, the welded portions 28 are formed by performing arc-welding.

The front attachment portion 22B and the rear attachment portion 22C are plate-shaped portions extending radially outward from the curved portion 22A. The rear attachment portion 22C is placed so that a rear end side in the vehicle front-rear direction is inclined upward relative to a front end side toward a vehicle rear side. The front attachment portion 22B is placed so that a front end side in the vehicle front-rear direction is inclined downward relative to a rear end side toward a vehicle front side. Bolt through-holes 30 through which the after-mentioned bolts 44, 66 penetrate are formed in the front attachment portion 22B and the rear attachment portion 22C. Although not illustrated herein, the bolt through-holes 30 through which the bolts 44 penetrate are formed at two positions on both sides, in the vehicle width direction, in the front attachment portion 22B (see FIG. 1). The bolt through-holes 30 through which the bolts 66 penetrate are formed at two positions on both sides, in the vehicle width direction, in the rear attachment portion 22C (see FIG. 1).

The upper bracket 22 is constituted by a press material formed by press molding or an extruded material formed by extrusion molding, for example. Further, the upper bracket 22 is constituted by metal (aluminum, magnesium, iron, and the like), resin, or a composite of metal and resin. In the present embodiment, the upper bracket 22 is formed by extrusion molding of aluminum.

As illustrated in FIG. 2, the lower bracket 24 is placed so as to cover a lower side of the instrument panel reinforcement 14 and extends in a direction (the front-rear direction of the instrument panel reinforcement 14) intersecting with an axial direction of the instrument panel reinforcement 14. More specifically, the lower bracket 24 includes: a curve-shaped portion 24A formed in a curved shape along a bottom face of the outer peripheral surface of the instrument panel reinforcement 14; a front extension portion 24B extending forward from a front end of the curve-shaped portion 24A; and a rear extension portion 24C extending rearward from a rear end of the curve-shaped portion 24A.

A seat 34 to which a bolt 32 is fastened and fixed is formed in a lower part of the curve-shaped portion 24A, and a through-hole 36 through which the bolt 32 penetrates is formed in the seat 34. A nut 38 is attached to a lower part of the instrument panel reinforcement 14 at a position corresponding to the through-hole 36. When the bolt 32 is inserted into the through-hole 36 from a lower side of the curve-shaped portion 24A so as to be fastened to the nut 38, the lower bracket 24 is fixed to the instrument panel reinforcement 14. That is, the lower bracket 24 is joined to the instrument panel reinforcement 14 by fastening. Although not illustrated herein, the lower bracket 24 is fastened and fixed by the bolts 32 and the nuts 38 to the instrument panel reinforcement 14 at two positions in the vehicle width direction. Front and rear parts of the curve-shaped portion 24A in the front-rear direction (parts except for the seat 34 in the present embodiment) make contact with, that is, make close contact with the bottom face of the outer peripheral surface of the instrument panel reinforcement 14, and in this state, the lower bracket 24 is fastened and fixed to the instrument panel reinforcement 14.

The front extension portion 24B includes an attachment portion 40 placed at a position overlapping with the front attachment portion 22B of the upper bracket 22, and a column attachment portion 42 placed on the front side relative to the attachment portion 40. The attachment portion 40 extends forward from a front end of the curve-shaped portion 24A, and has a shape projecting downward in the up-down direction. The attachment portion 40 has an upper insertion hole 48 to which a tubular member 46 for adjusting a gap with respect to the front attachment portion 22B is attached, and a hole portion 50 communicating with the insertion hole 48 on a lower side of the insertion hole 48. An inside diameter of the insertion hole 48 is larger than an inside diameter of the hole portion 50. The tubular member 46 is joined to an inner wall of the insertion hole 48 by bonding and the like. Further, an internal screw thread portion to which the bolt 44 is threadedly engaged is provided in the hole portion 50. The bolt 44 is inserted into the bolt through-hole 30 from an upper side of the front attachment portion 22B of the upper bracket 22, and the bolt 44 is fastened to the internal screw thread portion of the hole portion 50. Hereby, the front attachment portion 22B of the upper bracket 22 and the front extension portion 24B of the lower bracket 24 are fastened and fixed to each other. Note that, instead of the configuration in which the bolt 44 is fastened to the internal screw thread portion of the hole portion 50, or in addition to the configuration in which the bolt 44 is fastened to the internal screw thread portion of the hole portion 50, the tubular member 46 may be constituted by a nut so that the bolt 44 is fastened to the nut. Further, instead of the configuration in which the tubular member 46 is joined to the inner wall of the insertion hole 48 by bonding and the like, an external screw thread portion may be formed on an outer periphery of the tubular member 46 and an internal screw thread portion may be formed on the insertion hole 48, so that the tubular member 46 is fastened to the insertion hole 48. As illustrated in FIG. 1, the front attachment portion 22B of the upper bracket 22 and the front extension portion 24B of the lower bracket 24 are fastened and fixed to each other with the bolts 44 and the like at two positions in the vehicle width direction.

Figure 3:
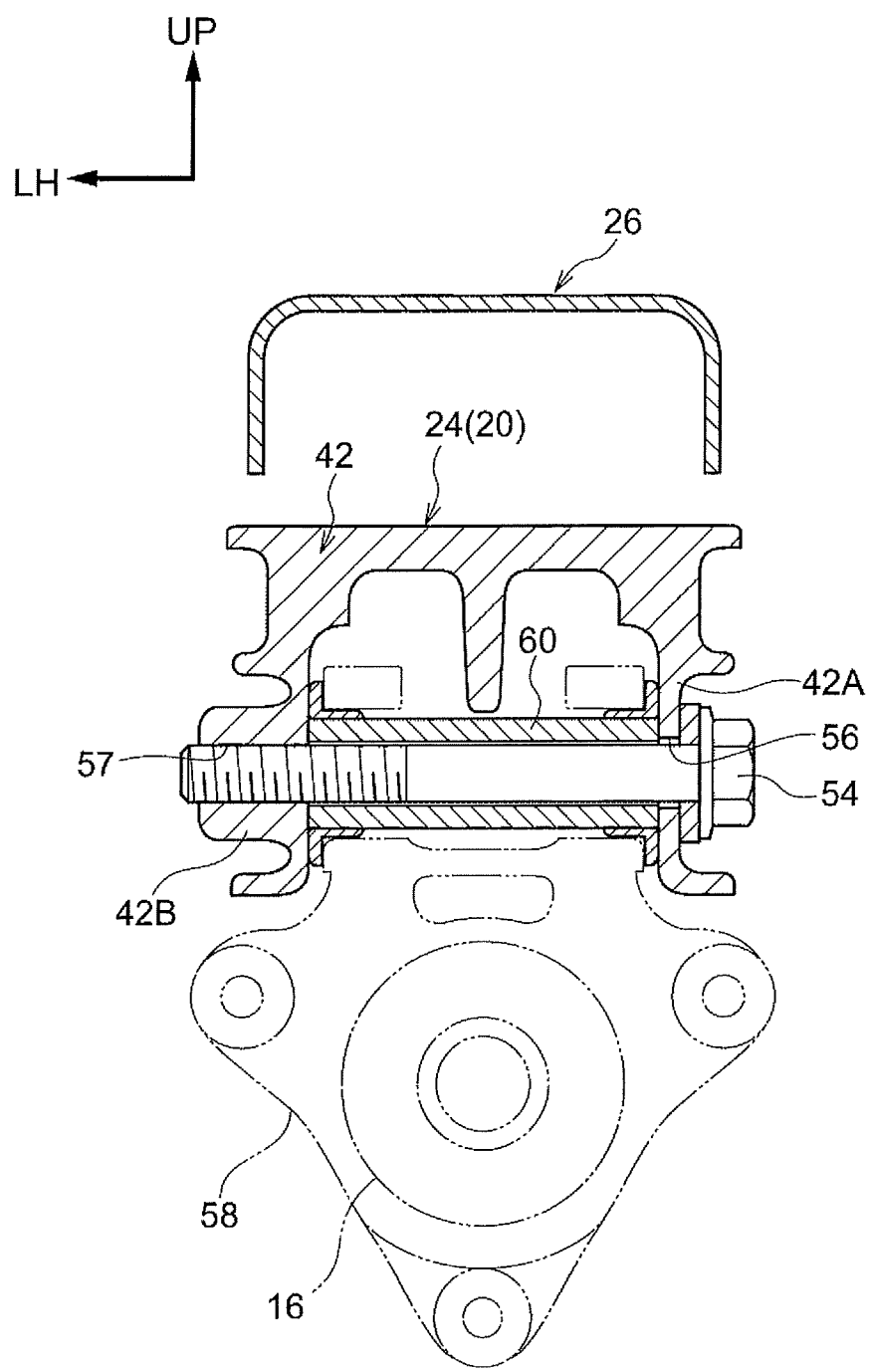
FIG. 3 is a sectional view illustrating the steering support structure along a line III-III in FIG. 2.

As illustrated in FIG. 3, the column attachment portion 42 is formed generally in a U-shape in a section cut generally along the vehicle up-down direction and is placed so as to be opened on a vehicle lower side. The column attachment portion 42 includes a pair of attachment pieces 42A, 42B provided on both sides in the vehicle width direction so as to extend towards the vehicle lower side. A bolt through-hole 56 into which a bolt 54 is inserted is formed in one attachment piece 42A. An internal screw thread portion 57 to which the bolt 54 is threadedly engaged is formed in the other attachment piece 42B. A column bracket 58 is attached to a front side of the steering column 16 in the front-rear direction. The column bracket 58 is provided with a collar 60 into which the bolt 54 is inserted (see FIG. 2). The bolt 54 is inserted into the bolt through-hole 56 from a side closer to the attachment piece 42A and the bolt 54 is also inserted into the collar 60, so that the bolt 54 is fastened to the internal screw thread portion 57 of the attachment piece 42B. Hereby, the column bracket 58 is fastened and fixed to the column attachment portion 42 of the lower bracket 24.

As illustrated in FIG. 2, the rear extension portion 24C includes an attachment portion 62 placed at a position overlapping with the rear attachment portion 22C of the upper bracket 22, and a column attachment portion 64 placed on the rear side relative to the attachment portion 62. The attachment portion 62 extends rearward from a rear end of the curve-shaped portion 24A, and has a shape projecting downward in the up-down direction. The attachment portion 62 has an upper insertion hole 70 to which a tubular member 68 for adjusting a gap with respect to the rear attachment portion 22C is attached, and a hole portion 72 communicating with the insertion hole 70 on a lower side of the insertion hole 70. An inside diameter of the insertion hole 70 is larger than an inside diameter of the hole portion 72. The tubular member 68 is joined to an inner wall of the insertion hole 70 by bonding and the like. Further, an internal screw thread portion to which the bolt 66 is threadedly engaged is provided in the hole portion 72. The bolt 66 is inserted into the bolt through-hole 30 from an upper side of the rear attachment portion 22C of the upper bracket 22, and the bolt 66 is fastened to the internal screw thread portion of the hole portion 72. Hereby, the rear attachment portion 22C of the upper bracket 22 and the rear extension portion 24C of the lower bracket 24 are fastened and fixed to each other. Note that, instead of the configuration in which the bolt 66 is fastened to the internal screw thread portion of the hole portion 72, the tubular member 68 may be constituted by a nut so that the bolt 66 is fastened to the nut. As illustrated in FIG. 1, the rear attachment portion 22C of the upper bracket 22 and the rear extension portion 24C of the lower bracket 24 are fastened and fixed to each other with the bolts 66 and the like at two positions in the vehicle width direction.

As illustrated in FIG. 2, in the steering support structure 12, the front and rear parts of the curve-shaped portion 24A of the lower bracket 24 (parts except for the seat 34 in the present embodiment) make close contact with the bottom face of the outer peripheral surface of the instrument panel reinforcement 14, and in this state, the lower bracket 24 is joined to the instrument panel reinforcement 14 by fastening. That is, in a state where the instrument panel reinforcement 14 is sandwiched between the upper bracket 22 and the lower bracket 24, the lower bracket 24 and the upper bracket 22 are fastened and fixed to each other on the front side and the rear side in the front-rear direction.

Figure 4:
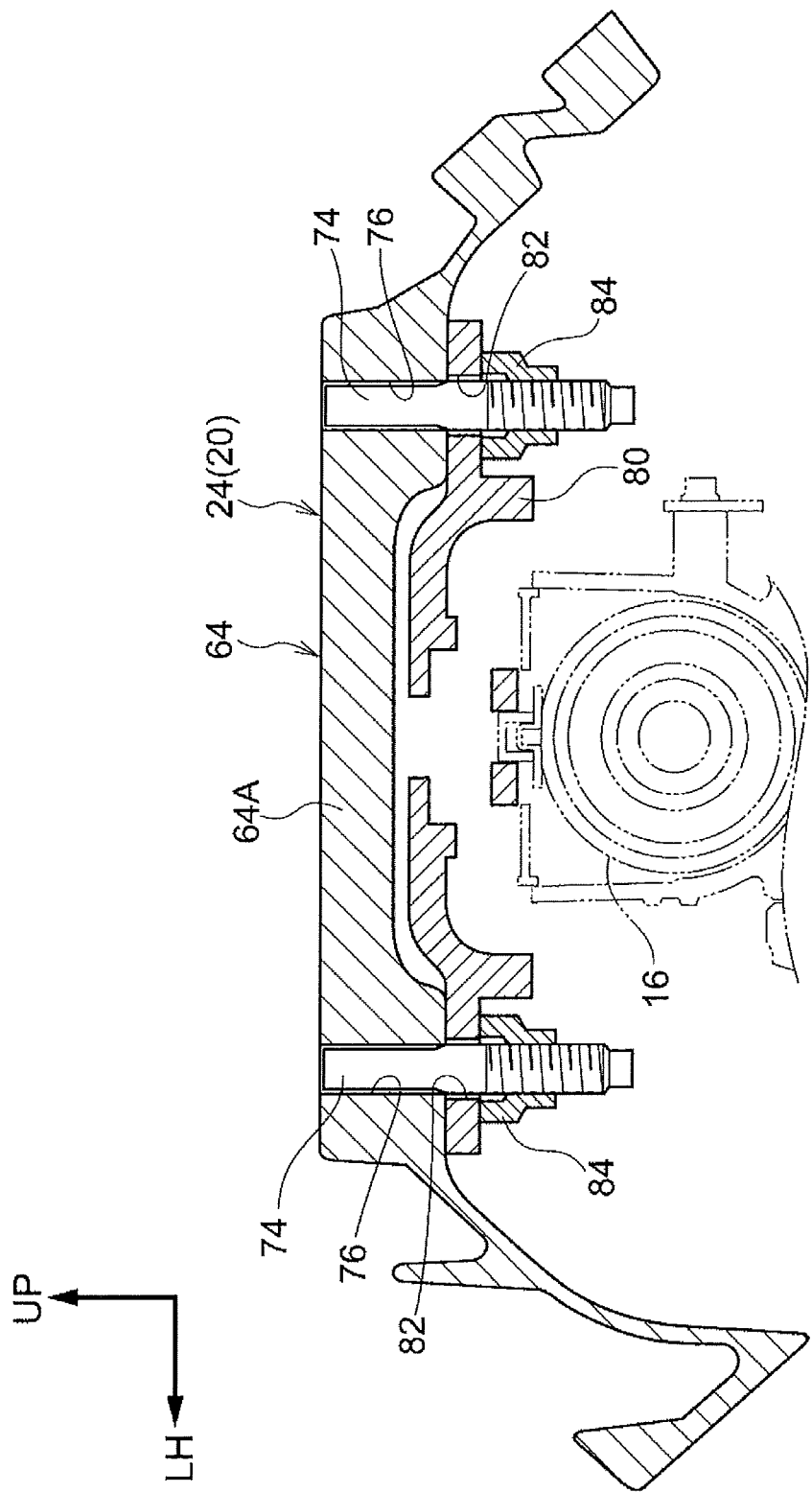
FIG. 4 is a sectional view illustrating the steering support structure along a line IV-IV in FIG. 2.

As illustrated in FIG. 4, the column attachment portion 64 is formed generally in a C-shape in a section cut generally along the vehicle up-down direction and is placed so as to be opened on the vehicle lower side. The column attachment portion 64 includes an upper wall portion 64A placed along the vehicle width direction. Attachment holes 76 to which stud bolts 74 are attached are formed on both sides of the upper wall portion 64A in the vehicle width direction. A column bracket 80 is attached to a rear side of the steering column 16 in the front-rear direction (see FIG. 2). A structure in which the steering column 16 is attached to the column bracket 80 is not illustrated herein. Through-holes 82 are formed on both sides of the column bracket 80 in the width direction at positions corresponding to the attachment holes 76, and weld nuts 84 are attached to the through-holes 82 (see FIG. 2). The stud bolt 74 is fastened to the weld nut 84. Hereby, the column bracket 80 is fastened and fixed to the column attachment portion 64 of the lower bracket 24.

The lower bracket 24 is constituted by an injection molded product, for example. The lower bracket 24 is constituted by metal (aluminum, magnesium, iron, and the like), resin, or a composite of metal and resin, for example. In the present embodiment, the lower bracket 24 is a die-casting product made of aluminum. Here, the die-casting is one of metal mold casting methods and is a casting method for producing a lot of castings with a high dimension accuracy in a short time by press-fitting molten metal into a die.

As described above, in the steering support structure 12, the lower bracket 24 is a die-casting product, and the upper bracket 22 is constituted by a press material or an extruded material. In the present embodiment, the upper bracket 22 is constituted by an extruded material. Hereby, a ductility of the upper bracket 22 is higher than a ductility of the lower bracket 24.

Further, the lower bracket 24 is a die-casting product that can be hardly welded to other members. On this account, the lower bracket 24 is fastened and fixed to the instrument panel reinforcement 14 with the bolts 32 and the like. Further, the lower bracket 24 and the upper bracket 22 are fastened and fixed to each other with the bolts 44 and the like on the front side in the vehicle front-rear direction, and are fastened and fixed to each other with the bolts 66 and the like on the rear side in the vehicle front-rear direction.

As illustrated in FIG. 2, the dash-to-brace 26 is joined to a top face of the curved portion 22A of the upper bracket 22 with a welded portion 86. The welded portion 86 is formed by performing arc-welding, for example. More specifically, the dash-to-brace 26 extends along the vehicle front-rear direction, and a rear end 26A of the dash-to-brace 26 is joined to the top face of the curved portion 22A with the welded portion 86. A front end 26B side of the dash-to-brace 26 extends diagonally downward toward the vehicle front side from the rear end 26A. The front end 26B of the dash-to-brace 26 is fixed to a body 90 (e.g., a dash panel) via a bracket 88. Although not illustrated herein, the front end 26B of the dash-to-brace 26 is fixed to the body 90 (e.g., the dash panel) via the bracket 88 with a fastener.

Next will be described the operation/working-effect of the first embodiment.

The steering support bracket 20 that supports the steering column 16 is attached to the instrument panel reinforcement 14 and the steering support bracket 20 is constituted by the upper bracket 22 and the lower bracket 24. The upper bracket 22 is joined to a top side of the instrument panel reinforcement 14 by the welded portions 28. The lower bracket 24 is joined to the bottom side of the instrument panel reinforcement 14 by fastening with the bolts 32 and the like. Further, the lower bracket 24 and the upper bracket 22 are joined to each other on the front side and the rear side by fastening with the bolts 44, 66 and the like. Hereby, the curved portion 22A of the upper bracket 22 can make close contact with the top side of the instrument panel reinforcement 14 and the curve-shaped portion 24A of the lower bracket 24 can make close contact with the bottom side of the instrument panel reinforcement 14. Further, in a state where the instrument panel reinforcement 14 is sandwiched between the upper bracket 22 and the lower bracket 24, the upper bracket 22 and the lower bracket 24 can be joined to each other by fastening with the bolts 44, 66 and the like. On this account, a load transmitted from the steering to the steering column 16 can be efficiently transmitted to the instrument panel reinforcement 14 via the lower bracket 24 and the upper bracket 22.

Further, the upper bracket 22 and the lower bracket 24 are fastened and fixed to each other on the front side and the rear side with the bolts 44, 66 and the like. Hereby, even in a case where the lower bracket 24 is constituted by a die-casting product that can be hardly welded, the upper bracket 22 and lower bracket 24 can be firmly fixed to each other.

Further, in the steering support structure 12, the lower bracket 24 is a die-casting product, and the upper bracket 22 is constituted by a press material or an extruded material. Hereby, the ductility of the upper bracket 22 is higher than the ductility of the lower bracket 24. In the steering support structure 12, the front end 26B side of the dash-to-brace 26 is fastened to the body 90, and an input load at the time of a front collision of the vehicle 10 is transmitted from the dash-to-brace 26 to the upper bracket 22. That is, by transmitting the input load of the front collision of the vehicle 10 to the upper bracket 22 so as to be absorbed by the upper bracket 22, it is possible to restrain crack of the lower bracket 24.

Further, in the steering support structure 12, the steering column 16 is supported by the lower bracket 24. At this time, the lower bracket 24 is a die-casting product and the upper bracket 22 is constituted by a press material or an extruded material, so the ductility of the upper bracket 22 is higher than the ductility of the lower bracket 24. As a result, it is possible to increase support stiffness of the steering column 16 by the lower bracket 24. Hereby, a load from the steering can be efficiently transmitted from the lower bracket 24 to the instrument panel reinforcement 14.

Further, in the steering support structure 12, the lower bracket 24 is a die-casting product that can be hardly welded, and the lower bracket 24 is joined to the instrument panel reinforcement 14 by fastening with the bolts 32 and the like. Further, the upper bracket 22 is constituted by a press material or an extruded material, and is joined to the instrument panel reinforcement 14 by the welded portions 28. Hereby, the lower bracket 24 and the upper bracket 22 can be firmly joined to the instrument panel reinforcement 14.

Second Embodiment

Figure 5:
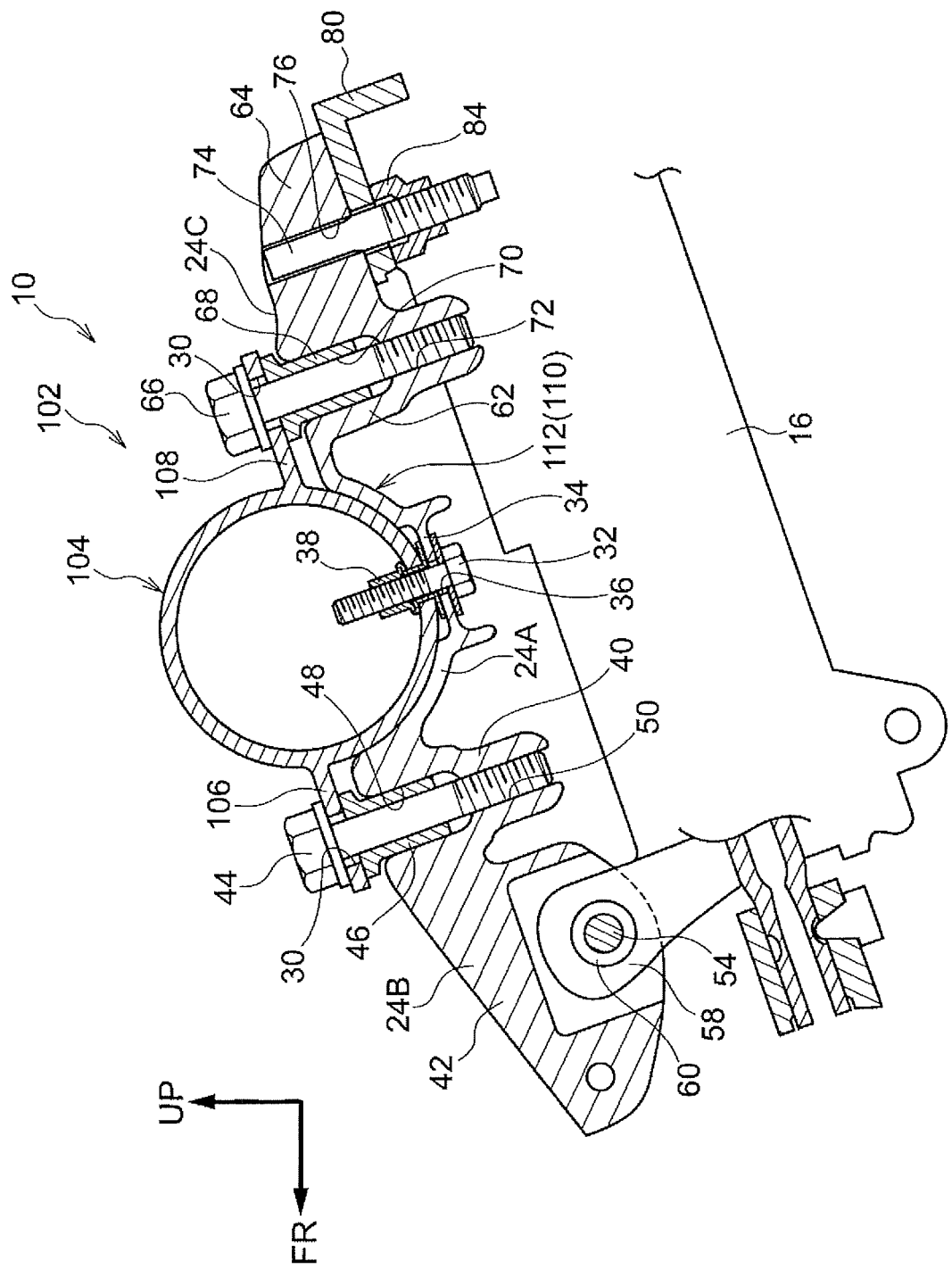
FIG. 5 is a sectional view illustrating a steering support structure of a second embodiment.

FIG. 5 illustrates a steering support structure 102 of the second embodiment. Note that the same constituent as in the first embodiment has the same reference sign as in the first embodiment, and description thereof is omitted.

As illustrated in FIG. 5, the steering support structure 102 includes an instrument panel reinforcement 104, and a steering support bracket 110 attached to the instrument panel reinforcement 104 and configured to support a steering column 16.

The instrument panel reinforcement 104 includes upper attachment portions 106, 108 extending in the front-rear direction from side portions of the instrument panel reinforcement 104. The attachment portions 106, 108 are formed in pair on the front side and the rear side of the instrument panel reinforcement 104, and extend toward a radially outer side of the instrument panel reinforcement 104 having a generally cylindrical shape. The attachment portions 106, 108 provided in pair on the front side and the rear side are formed integrally with the instrument panel reinforcement 104. In the present embodiment, the attachment portions 106, 108 are obliquely placed so that their front sides are placed on a lower side in the up-down direction relative to their rear sides.

Bolt through-holes 30 through which bolts 44 penetrate are formed in the attachment portion 106 on the front side in the instrument panel reinforcement 104. Although not illustrated herein, the bolt through-holes 30 are provided at two positions on both sides, in the width direction, of the attachment portion 106. Bolt through-holes 30 through which bolts 66 penetrate are formed in the attachment portion 108 on the rear side in the instrument panel reinforcement 104. Although not illustrated herein, the bolt through-holes 30 are provided at two positions on both sides, in the width direction, of the attachment portion 108.

The steering support bracket 110 includes a lower bracket 112 joined to a bottom side of the instrument panel reinforcement 104 and also joined to the attachment portions 106, 108 provided on an upper side of the instrument panel reinforcement 104. In the present embodiment, the steering support bracket 110 includes the lower bracket 112 constituted by one component. The lower bracket 112 is configured similarly to the lower bracket 24 of the first embodiment.

The lower bracket 112 is fastened and fixed to the bottom side of the instrument panel reinforcement 104 with a bolt 32 and a nut 38 provided in the instrument panel reinforcement 104.

The lower bracket 112 is joined to the attachment portion 106 on the front side of the instrument panel reinforcement 104 by fastening with the bolts 44 and the like. Further, the lower bracket 112 is joined to the attachment portion 108 on the rear side of the instrument panel reinforcement 104 by fastening with the bolts 66 and the like.

The lower bracket 112 is constituted by an injection-molded product, for example. The lower bracket 112 is constituted by metal (aluminum, magnesium, iron, and the like), resin, or a composite of metal and resin, for example. In the present embodiment, the lower bracket 112 is a die-casting product of aluminum.

Although not illustrated herein, a rear end of a dash-to-brace is joined to a top face of the instrument panel reinforcement 104 by welding.

Next will be described the operation/working-effect of the second embodiment.

The steering support bracket 110 that supports the steering column 16 is attached to the instrument panel reinforcement 14 and the steering support bracket 110 includes the lower bracket 112. The lower bracket 112 is joined to the bottom side of the instrument panel reinforcement 14 by fastening with the bolt 32 and the like. Further, the instrument panel reinforcement 104 includes the upper attachment portions 106, 108 formed integrally with the instrument panel reinforcement 104 and extending in the front-rear direction from the instrument panel reinforcement 104. The lower bracket 112 is joined to the attachment portion 106 on the front side by fastening with the bolts 44 and the like, and is joined to the attachment portion 108 on the rear side by fastening with the bolts 66 and the like.

Hereby, in a state where front and rear parts of the curve-shaped portion 24A of the lower bracket 112 make close contact with the bottom side of the instrument panel reinforcement 104, the upper attachment portions 106, 108 of the instrument panel reinforcement 104 can be joined to the lower bracket 112 by fastening with the bolts 44, 66, and the like. On this account, a load transmitted from a steering to the steering column 16 can be efficiently transmitted to the instrument panel reinforcement 104 via the lower bracket 112.

Further, in the steering support structure 102, the attachment portions 106, 108 extending from the instrument panel reinforcement 104 can be fastened and fixed to the lower bracket 112 with the bolts 44, 66, and the like. Hereby, even in a case where the lower bracket 112 is constituted by a die-casting product that can be hardly welded, the attachment portions 106, 108 and the lower bracket 112 can be fixed firmly to each other.

Note that, in the first embodiment, the shapes of the upper bracket 22 and the lower bracket 24 are modifiable. Further, in the second embodiment, the shape of the lower bracket 112 is modifiable.

Further, in the first and second embodiments, the configuration to support the steering column 16 by the lower bracket 24, 112 is modifiable. Further, the bonding between the upper bracket or the instrument panel reinforcement and the dash-to-brace may be modified to other configurations.

Further, in the first embodiment, the lower bracket 24 is a die-casting product and the upper bracket 22 is constituted by a press material or an extruded material, but the present disclosure is not limited to this configuration. For example, with the use of an upper bracket made by injection molding and a lower bracket made of a press material or an extruded material, a load transmitted from the steering to the steering column 16 can be efficiently transmitted to the instrument panel reinforcement 14 via the lower bracket and the upper bracket.

Further, in the first embodiment, the lower bracket 24 is fastened and fixed to the bottom side of the instrument panel reinforcement 14 and the upper bracket 22 is joined to the top side of the instrument panel reinforcement 14 by welding, but the present disclosure is not limited to this configuration. For example, the lower bracket 24 may be joined to the bottom side of the instrument panel reinforcement 14 by welding. Further, the upper bracket 22 may be fastened and fixed to the top side of the instrument panel reinforcement 14.

Further, in the second embodiment, the lower bracket 112 is a die-casting product, but the present disclosure is not limited to this configuration. For example, with the use of a lower bracket constituted by a press material or an extruded material, a load transmitted from the steering to the steering column 16 can be efficiently transmitted to the instrument panel reinforcement 104 via the lower bracket.

Further, in the second embodiment, the lower bracket 112 is fastened and fixed to the bottom side of the instrument panel reinforcement 104 with the bolt 32 and the like, but the present disclosure is not limited to this configuration. For example, the lower bracket may be joined to the bottom side of the instrument panel reinforcement 104 by welding.

Furthermore, in the second embodiment, the attachment portions 106, 108 of the instrument panel reinforcement 104 are fastened and fixed to the lower bracket 112 with the bolts 44, 66, and the like, but the present disclosure is not limited to this configuration. The attachment portions 106, 108 of the instrument panel reinforcement 104 may be joined to the lower bracket 112 by other joining methods such as welding.

Note that specific embodiments of the present disclosure have been described above, but the present disclosure is not limited to those embodiments, and it is obvious to those skilled in the art that the embodiments are variously modifiable within the scope of the disclosure.

What is claimed is:

1. A steering support structure comprising:
    an instrument panel reinforcement extending in a vehicle width direction; and
    a steering support bracket attached to the instrument panel reinforcement and supports a steering column, the steering support bracket including
        an upper bracket joined to an upper side of the instrument panel reinforcement in a vehicle up-down direction, and
        a lower bracket joined to a lower side of the instrument panel reinforcement in the vehicle up-down direction and fastened and fixed to the upper bracket,
    wherein the lower bracket is directly fastened and fixed, at a center portion of the lower bracket in a vehicle front-rear direction, to the lower side of the instrument panel reinforcement using a fastening member passing through the lower bracket and the lower side of the instrument panel reinforcement.

2. The steering support structure according to claim 1, wherein a ductility of the upper bracket is higher than a ductility of the lower bracket.

3. The steering support structure according to claim 2, wherein the steering column is supported by the lower bracket.

4. The steering support structure according to claim 1, wherein:
    the upper bracket is joined to the instrument panel reinforcement welding; and
    the lower bracket is a die-casting product.

5. The steering support structure according to claim 1, wherein
    the instrument panel reinforcement has a cylindrical shape;
    the upper bracket includes
        a first curved portion curved along an upper side of an outer peripheral surface of the instrument panel reinforcement in the vehicle up-down direction,
        a front attachment portion extending in a vehicle forward direction from a vehicle front-side end of the first curved portion, and
        a rear attachment portion extending in a vehicle rearward direction from a vehicle rear-side end of the first curved portion; and
    the lower bracket includes
        a second curved portion curved along a lower side of the outer peripheral surface of the instrument panel reinforcement in the vehicle up-down direction,
        a front extension portion extending in the vehicle forward direction from a vehicle front-side end of the second curved portion and fastened and fixed to the front attachment portion, and
        a rear extension portion extending in the vehicle rearward direction from a vehicle rear-side end of the second curved portion and fastened and fixed to the rear attachment portion.

6. The steering support structure according to claim 1, further comprising a dash-to-brace extending in the vehicle front-rear direction, a rear end of the dash-to-brace being welded to an upper side of the upper bracket and a front end of the dash-to-brace being fixed to a vehicle body.

* * * * *